W. R. CAMPBELL.
GLASS DRAWING APPARATUS.
APPLICATION FILED SEPT. 27, 1913.
1,122,475.
Patented Dec. 29, 1914.
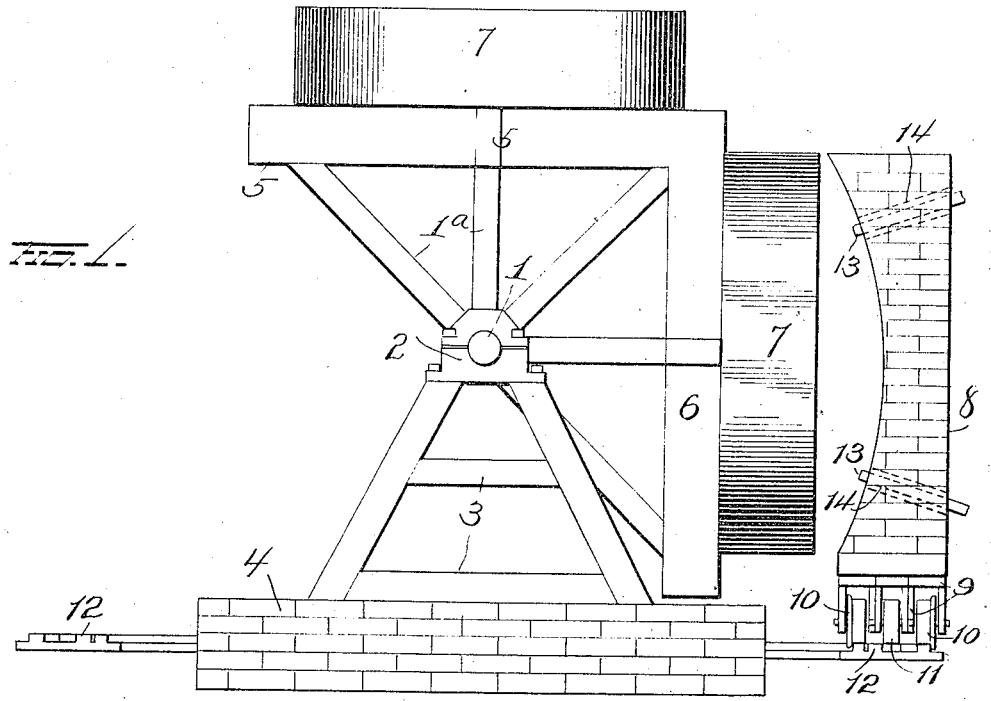
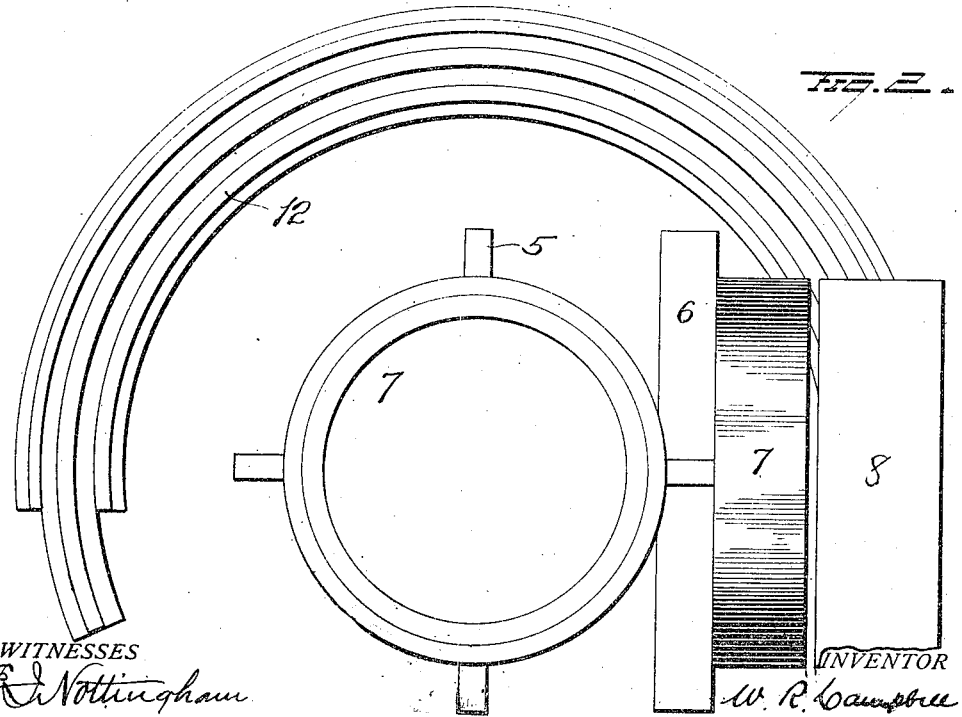
WITNESSES
E. W. Nottingham
G. F. Downing
INVENTOR
W. R. Campbell
By H. A. Seymour, Attorney

UNITED STATES PATENT OFFICE.

WILLIAM R. CAMPBELL, OF LANCASTER, OHIO.

GLASS-DRAWING APPARATUS.

1,122,475.  Specification of Letters Patent.  Patented Dec. 29, 1914.

Application filed September 27, 1913. Serial No. 792,149.

*To all whom it may concern:*

Be it known that I, WILLIAM R. CAMPBELL, of Lancaster, in the county of Fairfield and State of Ohio, have invented certain new and useful Improvements in Glass-Drawing Apparatus; and I do hereby declare the following to be a full, clear, and exact description of the invention, such as will enable others skilled in the art to which it appertains to make and use the same.

My invention relates to an improvement in glass drawing apparatus, and it consists in a pot carrying frame with two pots located at right angles, so that a movement of the frame through an arc of ninety degrees will carry one pot from a horizontal position to a vertical or draining position, and the other pot from its vertical or draining position, to a horizontal position to receive a charge of molten glass, and a heating furnace mounted on a horizontal track through an arc of one hundred and eighty degrees concentric with the pots, so that it can be moved to position immediately in front of either pot when the latter is in its vertical or draining position.

My invention further consists in the details of construction and combination of parts as will be more fully described and pointed out in the claims.

In the accompanying drawings, Figure 1 is a view in side elevation of my improved apparatus and Fig. 2 is a view in plan of same.

1 represents a shaft mounted in bearings 2 carried by the frame 3 which is supported in the foundation 4. This shaft 1 is provided with arms 1ᵃ which may be rigidly secured to the shaft, 1 or rigid with a hub mounted to turn on the shaft, which arms carry the tables 5 and 6, the latter being located edge to edge and at right angles to each other as shown, so that when one table is horizontal, the other will be vertical, the construction being such that each table can turn through an arc of ninety degrees.

Each table 5 and 6, carries a pot 7, hence a quarter turn of the table shifts one pot from its horizontal or drawing position, to its vertical or draining position, so that when one pot is in its horizontal position and contains the supply of melted glass from which the cylinder is being drawn, the other will be in a position to permit the glass remaining in the pot after the cylinder has been drawn, to drain off.

In order to remove all the glass from a pot prior to refilling for another drawing, it is necessary to maintain the glass in the pot being drained, in a melted condition and this I accomplish by a movable furnace 8, which latter can be shifted through an arc of one hundred and eighty degrees so as to heat each pot as it is turned from its drawing to its draining positions. This furnace 8 is mounted on a truck 9, provided with a series of flanged wheels 10, and if desired with intermediate wheels 11, which in the present instance are without flanges. This truck is mounted on a curved trackway 12, which may be an endless circular track, or simply of sufficient length to permit of the necessary movement of the furnace. It is however located concentric to the pots carrying frame so that when shifted from its position in front of one pot to the other, it will bear substantially the same relation to each. The truck 9 is curved to conform to the trackway 12, and the furnace 8 is preferably provided with a concave inner face, and with fuel burners 13 which may be for oil or gas, the opening 14 through which the burner pipes pass, being larger than the burner pipes so as to permit the free passage of air, which, commingling with the oil or gas as the latter issues from the burners, produces an intense heat sufficient to melt the glass remaining in the pot, and as the pot is, while being thus heated, in a vertical position, the glass, as it becomes fluid, drains from the pot thus leaving the latter clean and ready to receive another supply of melted glass. The pots are approximately the same surface area as the furnace and set comparatively close to the latter so that the inner furnace of the pot will be within the heating influence of the furnace.

In the operation of the apparatus, after the vertical pot has been drained of its excess glass, the furnace 8 is moved bodily around a half circle so as to be in a position to heat the horizontal pot as soon as same is turned to its vertical position, and it occupies precisely the same relation to this pot as it did to the one at the other side. The tables carrying the pots may be turned from one position to the other, the furnace subsequently shifted, or the furnace may be first shifted the whole, or part way around to its next position, and the tabl̶ ͏͏en turned.

With this improvement there is no lifting of the pots and no movement of the table except a part rotary movement, hence the mechanism for actuating the tables may be comparatively simple and inexpensive and no time whatever need be lost in shifting one pot from its vertical or draining position to its upright position under the drawing apparatus.

It is evident that many slight changes might be made in the relative arrangement of parts shown and described without departing from the spirit and scope of my invention. Hence I would have it understood that I do not wish to confine myself to the exact construction and arrangement of parts shown and described but Having fully described my invention what I claim as new and desire to secure by Letters-Patent, is:—

1. In a glass drawing apparatus, the combination of a frame mounted to turn on a horizontal axis and having pot carrying supports at right angles to each other whereby a quarter turn of the frame will move one pot from its vertical to a horizontal position, and move the other pot from a horizontal to a vertical position, and a furnace mounted on a truck whereby it may be shifted from one side of said pivoted frame to the other for heating the pots when the latter are in their vertical positions.

2. In a glass drawing apparatus, the combination of a frame mounted to turn on a horizontal axis and having two pot carrying tables located edge to edge at right angles, a circular track concentric with said frame, and a furnace mounted on a truck adapted to travel on said track.

3. In a glass drawing apparatus, the combination of a frame mounted to rock on a horizontal support, two pot carrying tables secured to said frame, the said tables being at right angles and edge to edge so that when one table is horizontal the other will be vertical, a horizontal track way concentric with the frame, a truck on said trackway and a furnace mounted on said truck the furnace adapted to be moved to a position adjacent the pot on the vertical table.

In testimony whereof, I have signed this specification in the presence of two subscribing witnesses.

WILLIAM R. CAMPBELL.

Witnesses:
S. O. BURTON,
BESSE OUTCAULT.